UNITED STATES PATENT OFFICE.

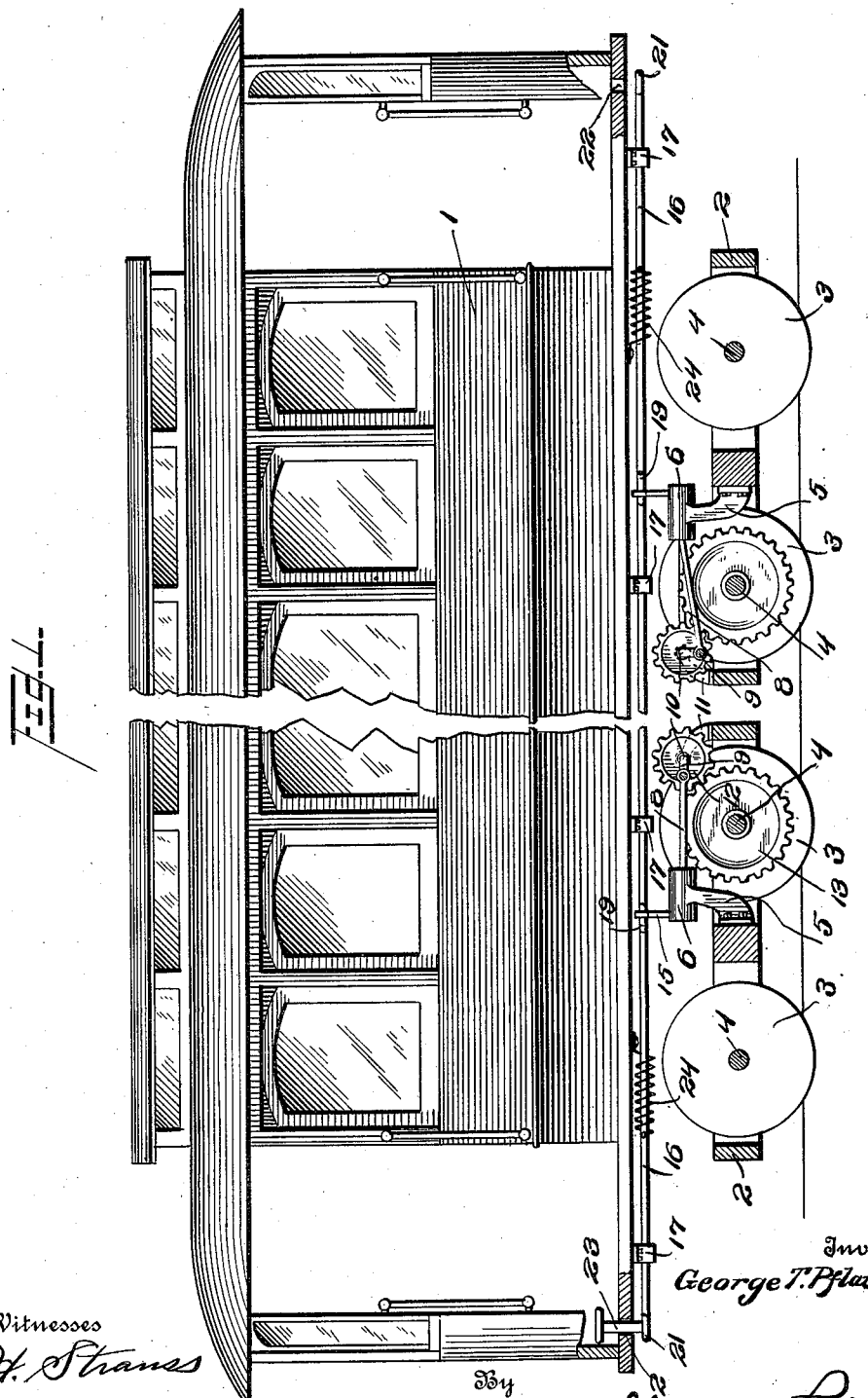

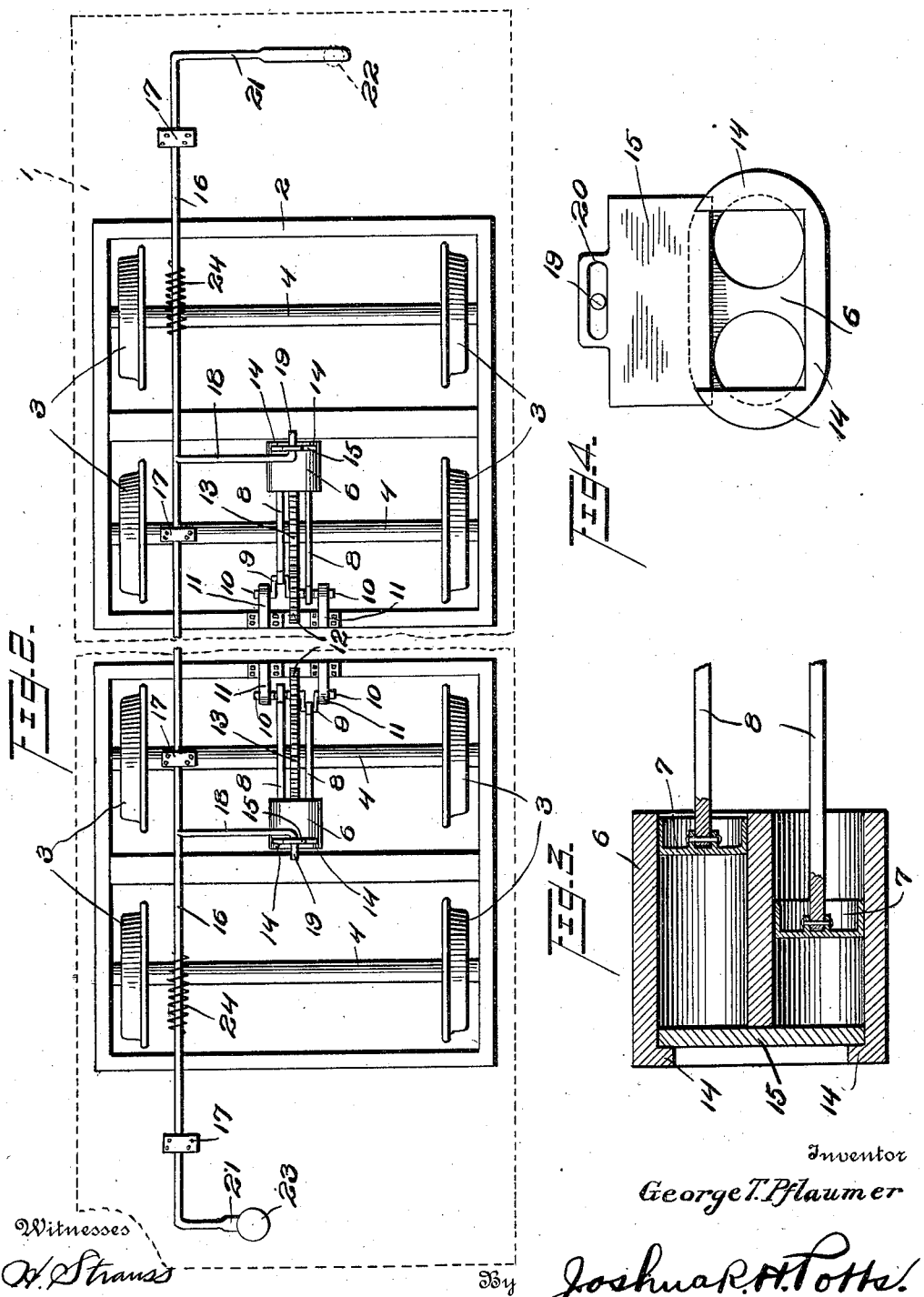

GEORGE T. PFLAUMER, OF PHILADELPHIA, PENNSYLVANIA.

BRAKE.

1,042,598.  Specification of Letters Patent.  Patented Oct. 29, 1912.

Application filed November 18, 1911. Serial No. 660,971.

*To all whom it may concern:*

Be it known that I, GEORGE T. PFLAUMER, a citizen of the United States, residing at Philadelphia, in the county of Philadelphia and State of Pennsylvania, have invented certain new and useful Improvements in Brakes, of which the following is a specification.

My invention relates to improvements in brakes, the object of the invention being to provide an improved brake which is especially adapted for use on cars, and which utilizes the compression of air to stop the car.

A further object is to provide an improved arrangement of cylinders, pistons and means connecting the same with axles of the car, whereby the pistons are caused to reciprocate in the cylinders together with improved means for controlling the flow of air into and out of said cylinders, and thereby brake the car.

With these and other objects in view, the invention consists in certain novel features of construction and combinations and arrangements of parts, as will be more fully hereinafter described and pointed out in the claims.

In the accompanying drawings: Figure 1, is a broken view partly in elevation and partly in longitudinal section illustrating my improvements. Fig. 2, is a plan view of the trucks and illustrating my improvements in connection therewith. Fig. 3, is an enlarged view in horizontal section through a pair of cylinders 6, and Fig. 4, is an end view of Fig. 3.

1, represents a car body which is supported on suitable trucks 2, the latter having the ordinary wheels 3 to run upon a track, and each pair of wheels connected by an axle 4 as is common in cars of this type. Brackets 5 are secured to the truck adjacent its center, and support twin cylinders 6. These cylinders 6 are open at both ends, and pistons 7 are mounted to reciprocate in the cylinders, and are connected by pitmen 8 with crank arms 9 on a crank shaft 10. This crank shaft 10 is mounted in brackets 11 on the truck, and has secured thereto a relatively small gear 12 which meshes with a relatively large gear 13 fixed to an axle 4. As both trucks are preferably provided with braking mechanism precisely alike, the above description of one will apply alike to both.

The crank arms 9 on shaft 10 are located at right angles to each other, so that one piston 7 is always in advance of the other, and there can be no dead center of the device. The ends of the twin cylinders farthest removed from the crank shafts 10, are provided with guides 14 for a gate valve 15. This gate valve 15 is adapted to close or partially close the ends of the cylinders when it is moved downwardly, so as to regulate the passage of air into and out of the cylinders.

An operating shaft 16 mounted in brackets 17 on the bottom of the car, extends longitudinally of the car, and is provided with laterally projecting crank arms 18. These crank arms 18 have fingers 19 at their ends projecting at right angles to the arms, and positioned through elongated slots 20 in the gate valves 15, so that the movement of shaft 16 controls the movement of the gates. This shaft 16 is held in normal position by springs 24, which are coiled around the shaft, secured at one end to the shaft, and at their other ends to the car as clearly shown in Fig. 1.

At the free ends of the shaft 16, laterally projecting flattened crank arms 21 are provided, and these arms 21 project below openings 22 in the car platforms, through either of which a foot plunger 23 may be projected and supported on the crank arms, so as to allow the motorman to force the gates 15 downwardly by depressing the foot plunger. These arms 21 are preferably of different lengths, so as to locate the plunger 23 at approximately the same relative position at both platforms in accordance with the direction the car is moving.

By reason of the location of the twin cylinders, adjacent the centers of the trucks, and the connection of the fingers 19 in the slots 20, the trucks are allowed the necessary pivotal movement in rounding curves. I have not attempted to show just how the trucks are pivoted but it is to be understood that the invention is adapted for use on any ordinary style of truck, and the cylinders will be located as near the center as possible, so as to reduce the movement to the minimum at this point.

In operation, when the motorman desires to slack the speed of the car, he depresses foot plunger 23 causing shaft 16 to turn. This turning movement of shaft 16 moves arms 18 and fingers 19 downwardly whereby the gate valves 15, at the ends of cylinders 6 are partially closed so as to resist the passage of air through the cylinders caused by the movement of pistons. As the gates are moved downwardly, this resistance becomes greater and the car is brought to a stop or the speed slackened.

When the gates are entirely closed, the wheels will be stopped. The gates therefore, not only regulate the suction of air into the cylinders, but also regulate the flow of air out of the cylinders, and utilize both movements to brake the car. As soon as pressure is released on the plunger 23, the springs 24 return the parts to normal position.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a car truck, wheels supporting the truck, and axles connecting the wheels, of a cylinder mounted on the truck open at both ends and having transversely positioned guides at one end, a piston in the cylinder, means operated by one of the axles for reciprocating the piston, and a sliding gate valve in the guides of said cylinder controlling the passage of air therethrough, substantially as described.

2. The combination with a car truck, wheels supporting the truck, and axles connecting the wheels, of a cylinder mounted on the truck open at both ends and having transversely positioned guides at one end, a piston in the cylinder, means operated by one of the axles for reciprocating the piston, a sliding gate valve in the guides of said cylinder controlling the passage of air therethrough, a car body supported on the truck, and means on said car body for moving said valve, substantially as described.

3. The combination with a car, trucks supporting the car, wheels supporting the trucks, and axles connecting the wheels, of twin cylinders fixed to the trucks open at both ends and having transversely positioned guides at one end, pistons in said twin cylinders, gears on the axles, crank shafts, pinions on the crank shafts meshing with the gears on the axle, pistons in said cylinders, pitmen connecting the pistons and crank arms of said shafts, gate valves common to the twin cylinders and mounted to move vertically in the guides of said cylinders, and means on the car for simultaneously moving said gates, substantially as described.

4. The combination with a car, trucks supporting the car, wheels supporting the trucks, and axles connecting the wheels, of twin cylinders fixed to the trucks, pistons in said twin cylinders, gears on the axles, crank shafts, pinions on the crank shafts meshing with the gears on the axle, pistons in said cylinders, pitmen connecting the pistons and crank arms of said shafts, gate valves common to the twin cylinders and mounted to move vertically in the ends of said cylinders, a shaft extending longitudinally of the car, crank arms on said shaft, fingers on said crank arms, said gates having slots therein to receive said fingers, springs holding said shaft in normal position, other laterally projecting crank arms on said shaft, and a plunger adapted to be positioned through either of the platforms of the car and engage either of said last-mentioned crank arms, substantially as described.

In testimony whereof I have signed my name to this specification in the presence of two subscribing witnesses.

GEORGE T. PFLAUMER.

Witnesses:
R. H. KRENKEL,
CHAS. E. POTTS.

---

Copies of this patent may be obtained for five cents each, by addressing the "Commissioner of Patents, Washington, D. C."